March 19, 1929.  R. H. STALEY  1,706,260
TONGUE AND BOLSTER CONSTRUCTION
Filed Feb. 23, 1926  2 Sheets-Sheet 1
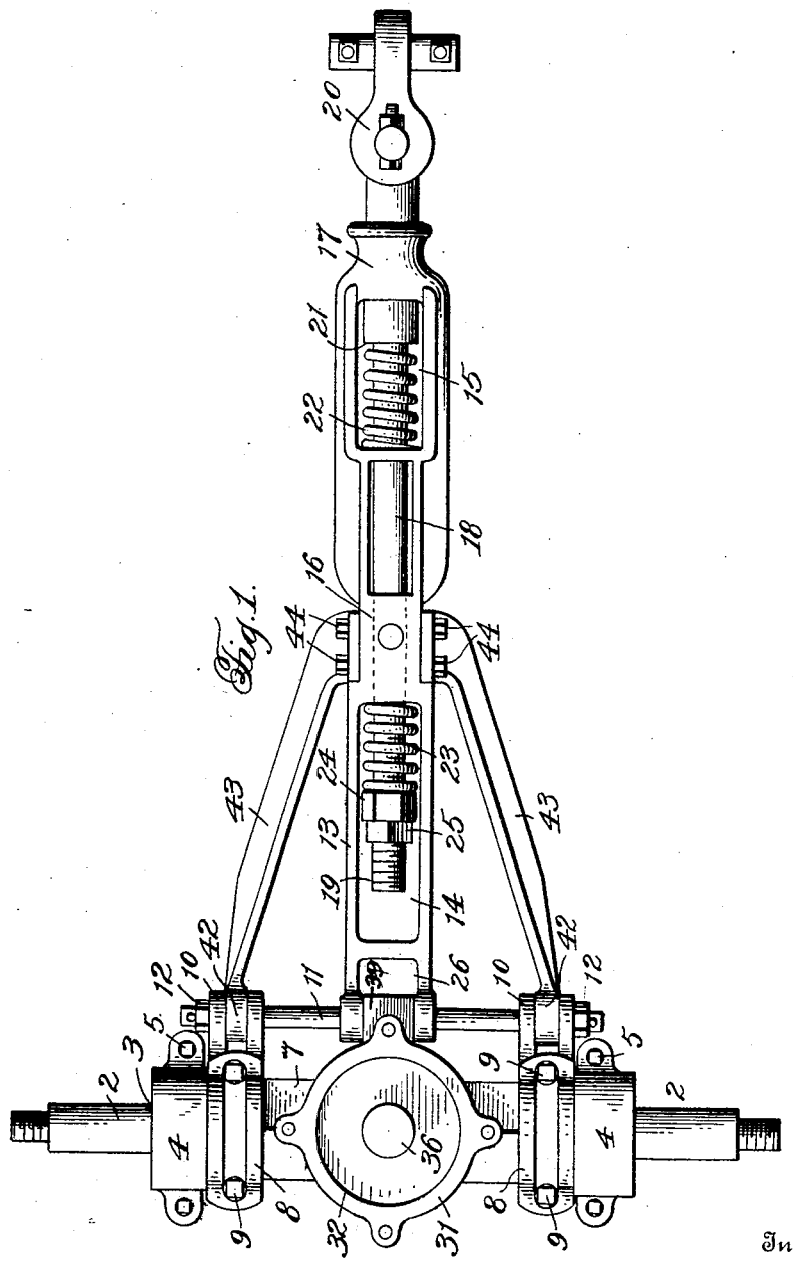
Witness:
Jas E Hutchinson
Inventor:
Raleigh H. Staley.
By Milans & Milans
Attorneys.

March 19, 1929.  R. H. STALEY  1,706,260
TONGUE AND BOLSTER CONSTRUCTION
Filed Feb. 23, 1926  2 Sheets-Sheet 2
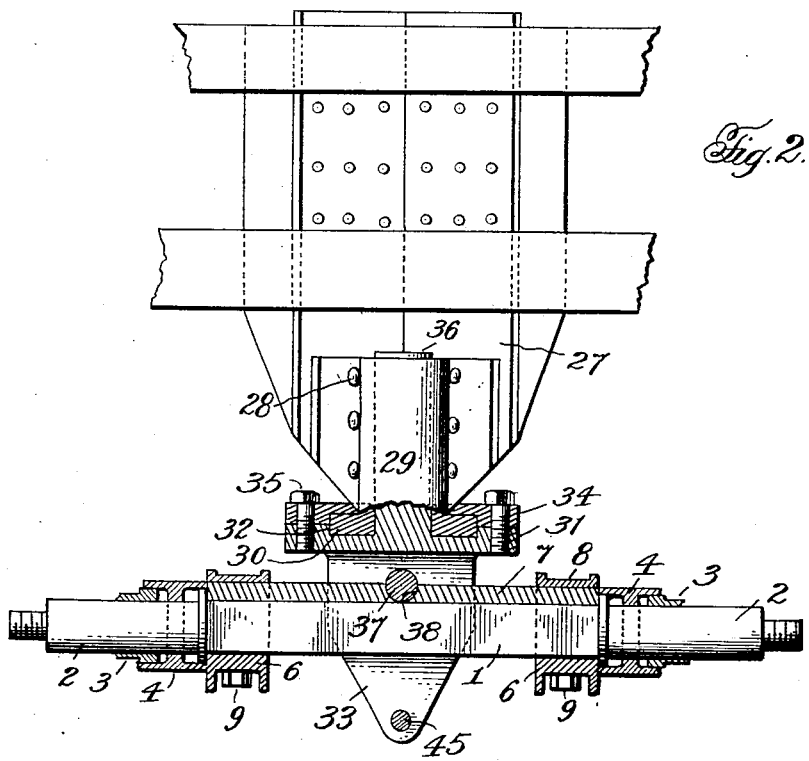
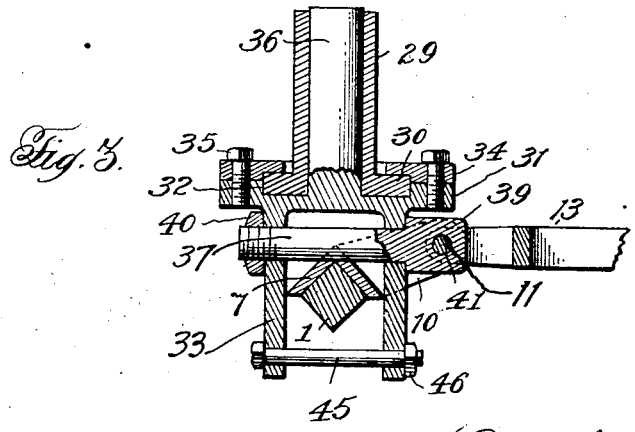

Patented Mar. 19, 1929.

1,706,260

UNITED STATES PATENT OFFICE.

RALEIGH H. STALEY, OF SPRINGFIELD, ILLINOIS, ASSIGNOR TO THE BAKER MANUFACTURING COMPANY, OF SPRINGFIELD, ILLINOIS, A CORPORATION OF ILLLINOIS.

TONGUE AND BOLSTER CONSTRUCTION.

Application filed February 23, 1926. Serial No. 90,048.

My invention relates to new and useful improvements in tongue and bolster constructions and more particularly to a device of this character adapted for connecting a vehicle to a tractor or other motive power or for connecting a plurality of the vehicles in tandem or in train; the disclosure of the drawings, forming a part of this application, showing the tongue and bolster as adapted for use in connection with a road grader or scraper.

The principal object of the invention resides in the provision of a device of the character described which is made up of a relatively small number of parts but which is of sufficient strength to prevent breakage under the use to which applied.

A further object of the invention consists in so forming the tongue as to take up the jar in starting and stopping, yieldable means being provided for this purpose.

With the above and other objects in view, my invention consists in the novel details of construction and arrangements of parts described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 illustrates a top plan.

Fig. 2 shows a rear elevation of the front axle of the vehicle with parts shown in longitudinal vertical section, and Fig. 3 is a sectional detail with parts shown in elevation.

In the drawings 1 indicates the central portion of the front axle of the vehicle and as shown more particularly in Fig. 3 of the drawings this portion of the axle is substantially square in cross section. The end portions 2 of the axle are round to receive the wheel hub, a portion of which is shown at 3 in Fig. 2 of the drawings. Dust caps for the inner end portions of the hubs 3 are shown at 4 and preferably are formed of upper and lower sections connected by means of the bolts 5 or other suitable fastenings. The lower sections of the dust caps have the inwardly extending portions 6 which engage beneath the squared portion 1 of the axle, as more particularly shown in Fig. 2 of the drawings, for a purpose to be later described. An axle bed plate 7 is positioned on the top of the squared portion 1 of the axle. The axle bed plate is of inverted V-shape, as shown more particularly in Fig. 3 of the drawings, and is secured to the axle by means of the axle clips 8 which extend over the upper surface of the bed plate adjacent the dust caps. Bolts 9 or other suitable fastenings extend through these clips 8, adjacent the ends, and through the extensions 6 of the lower sections of the hub cap thus holding the bed plate securely in position upon the axle. Adjacent each end of the axle bed plate 7 is provided with a forwardly extending pair of perforated lugs or ears 10, these pairs of lugs or ears supporting the transversely extending pin or rod 11 as shown more particularly in Fig. 1 of the drawings. It will be understood that the rod passes through the perforations of the lugs or ears and is held in position by means of the nuts 12 which engage the outer faces of the outer ears or lugs of each pair.

Pivotally connected to the transversely extending rod 11 is the tongue 13, this tongue having the elongated recesses 14 and 15 formed therein and separated by the portion 16 having a longitudinally extending opening therein. The forward extension 17 of the tongue also has a longitudinally extending opening therein and a draw bar or draw rod 18 extends through the opening in the portion 16 and the opening in the extension 17 and is thereby slidably mounted relative to the tongue. The inner end of the draw bar or draw rod 18 is threaded as shown at 19 and pivotally connected to the outer end of the bar or rod, for horizontal swinging movement, is the shackle 20. A shoulder 21 is formed intermediate the ends of the bar or rod 18 and is normally positioned within the recess 15 as shown more particularly in Fig. 1 of the drawings. A coiled spring 22 surrounds the rod or bar 18, within the recess 15, and between the inner end of the recess and the shoulder 21. A coiled spring 23 surrounds the rod or bar 18, within the recess 14, the inner end of the spring engaging the outer end of the recess with a nut 24 received on the threaded portion 19 and engaging the opposite end of the spring. A lock nut is shown at 25. The inner end of the tongue 13, which is connected to the transversely extending rod 11 is forked as shown at 26 for a purpose which will later appear.

The forward end of the vehicle frame is shown at 27 and secured to the frame, by rivets, bolts or other suitable fastenings 28, is the upper portion of the bolster or fifth wheel construction. This upper portion includes the vertically extending cylindrical portion 29 and the flange 30 formed on the lower end thereof. The lower portion of the bolster or fifth wheel construction includes the plate 31 having a recess 32 formed in its upper face for the reception of the flange 30 and also including the downwardly extending spaced arms 33 which straddle the central portion 1 of the axle and the axle bed plate 7, as more particularly illustrated in Figs. 2 and 3 of the drawings. A retaining ring 34 is secured to the plate 31 by means of the bolts 35 or other suitable fastenings and overlies the upper surface of the flange 30 thereby rotatably connecting the two sections of the bolster or fifth wheel. Extending upwardly from the plate 31 of the lower section of the bolster or fifth wheel is the pin 36 which passes through the cylindrical portion 29 of the upper section of the bolster or fifth wheel.

A bolt 37 extends through the downwardly extending arms 33, adjacent the upper ends thereof, and through a notch 38 formed in the upper surface of the bed plate 7 thus aiding in securing the bed plate in position. The outer end of the bolt has the enlarged head 39 and a nut 40 is received on the inner threaded end of the bolt for securing the same in position. The enlarged head 39 has a transversely extending opening 41, through which the rod 11 passes, and said enlarged head is received within the forked end 26 of the tongue 13 as shown more particularly in Fig. 1 of the drawings.

Pivotally mounted on the rod 11, between the pairs of ears or lugs 10, are the inner ends 42 of the hounds 43, the opposite ends of the hounds being secured to the sides of the tongue 13 by means of the bolts 44 or other suitable fastenings. The bolt 45 passes through the arms 33, adjacent the lower ends, and beneath the axle 1, and is secured in position by means of the nut 46.

From the above it is thought that the detail construction of my invention will be clearly understood. It will be seen that I have provided a novel form of bolster or fifth wheel for connection to the vehicle frame and that the tongue, of novel construction, is connected to the front axle for vertical swinging movement and that the draw bar or rod is both rotatably and slidably mounted within the tongue proper whereby a multiplicity of movements are allowed to take up for the movements of the vehicle when passing over uneven ground or the like. The springs 22 and 23 are provided for taking up jar in stopping and starting, the spring 22 being compressed to take up jar in stopping and the spring 23 being compressed to take up jar in starting. The bed plate is secured to the axle in a novel manner and the whole construction is of such a strength as to provide for the minimum breakage.

Having fully described my invention what I claim as new and desire to secure by Letters Patent is:

1. In combination with a vehicle frame, a fifth wheel connected to the frame, depending arms carried by the fifth wheel, an axle extending through the arms, a plate connected to the axle, and means passing through the arms and engaging the plate.

2. In combination with a vehicle frame, a fifth wheel, arms depending from the fifth wheel, an axle passing between the arms, a plate connected to the axle, and a bolt passing through the arms and engaging in a notch formed in the plate.

3. In combination with a vehicle frame, a fifth wheel connected to the frame, arms depending from the fifth wheel, an axle passing between the arms, a plate connected to the axle, ears formed on the plate, and a tongue pivotally connected to the ears for vertical swinging movement.

4. In combination with a vehicle frame, a fifth wheel connected to the frame, arms depending from the fifth wheel, an axle extending between the arms, a plate connected to the axle, a bolt extending through the arms and engageable in a notch formed in the plate, ears extending from the plate, a rod carried by the ears, and a tongue pivotally connected to the rod for vertical swinging movement.

5. In combination with a vehicle frame, a fifth wheel connected to the frame, arms depending from the fifth wheel, an axle extending between the arms, a plate connected to the axle, a bolt extending through the arms and engageable in a notch formed in the plate, ears extending from the plate, a rod carried by the ears, a tongue pivotally connected to the rod for vertical swinging movement, and a spring controlled slidable draw bar carried by the tongue.

In testimony whereof I hereunto affix my signature.

RALEIGH H. STALEY.